United States Patent [19]
Leplond et al.

[11] 3,800,605
[45] Apr. 2, 1974

[54] TRANSFER APPARATUS

[75] Inventors: Jean Leplond; Jean Biet, both of Compliegne, France

[73] Assignee: Uniroyal Englebert France S.A., Paris, France

[22] Filed: June 21, 1971

[21] Appl. No.: 155,255

Related U.S. Application Data

[62] Division of Ser. No. 794,706, Jan. 28, 1969, Pat. No. 3,613,903.

[52] U.S. Cl. .................................................. 74/89
[51] Int. Cl. .......................................... F16h 27/02
[58] Field of Search .... 74/600, 89; 214/1 BB, 1 BC, 214/1 BD

[56] References Cited
UNITED STATES PATENTS

| | | | |
|---|---|---|---|
| 3,276,606 | 10/1966 | Marchand | 214/1 BB |
| 2,834,218 | 5/1958 | Lovell | 74/600 |
| 2,785,746 | 3/1957 | Mathews | 214/1 BD |
| 2,811,267 | 10/1957 | Bock | 214/1 BC |
| 2,856,793 | 10/1958 | Budlong | 74/600 |
| 3,134,136 | 5/1964 | Soderquist | 214/1 BC |
| 3,222,715 | 12/1965 | Harris | 214/1 BC |
| 3,373,880 | 3/1968 | Dubesset | 214/1 BC |
| 3,552,061 | 1/1971 | Hermann | 74/89 |

*Primary Examiner*—Benjamin W. Wyche
*Assistant Examiner*—Wesley S. Ratliff, Jr.
*Attorney, Agent, or Firm*—Henry Sternberg

[57] ABSTRACT

A transfer apparatus for transferring an article from a first location, in which the article is in a first position, to a spaced second location, in which the article is in a second position spaced from and angularly shifted with respect to the first position thereof. The transfer apparatus includes a stationary frame supporting a pair of parallel arcuate guides extending between the aforesaid first and second locations, an article support structure extending between and being movable along these guides, and a pair of drive mechanisms simultaneously independently moving spaced portions of the article support structure different distances along the arcuate guides. Each of the drive mechanisms includes a drive crank, a connecting rod pivotally connected to the drive crank, and a mechanism for changing the location along the drive crank of the pivotal connection of the connecting rod.

6 Claims, 18 Drawing Figures

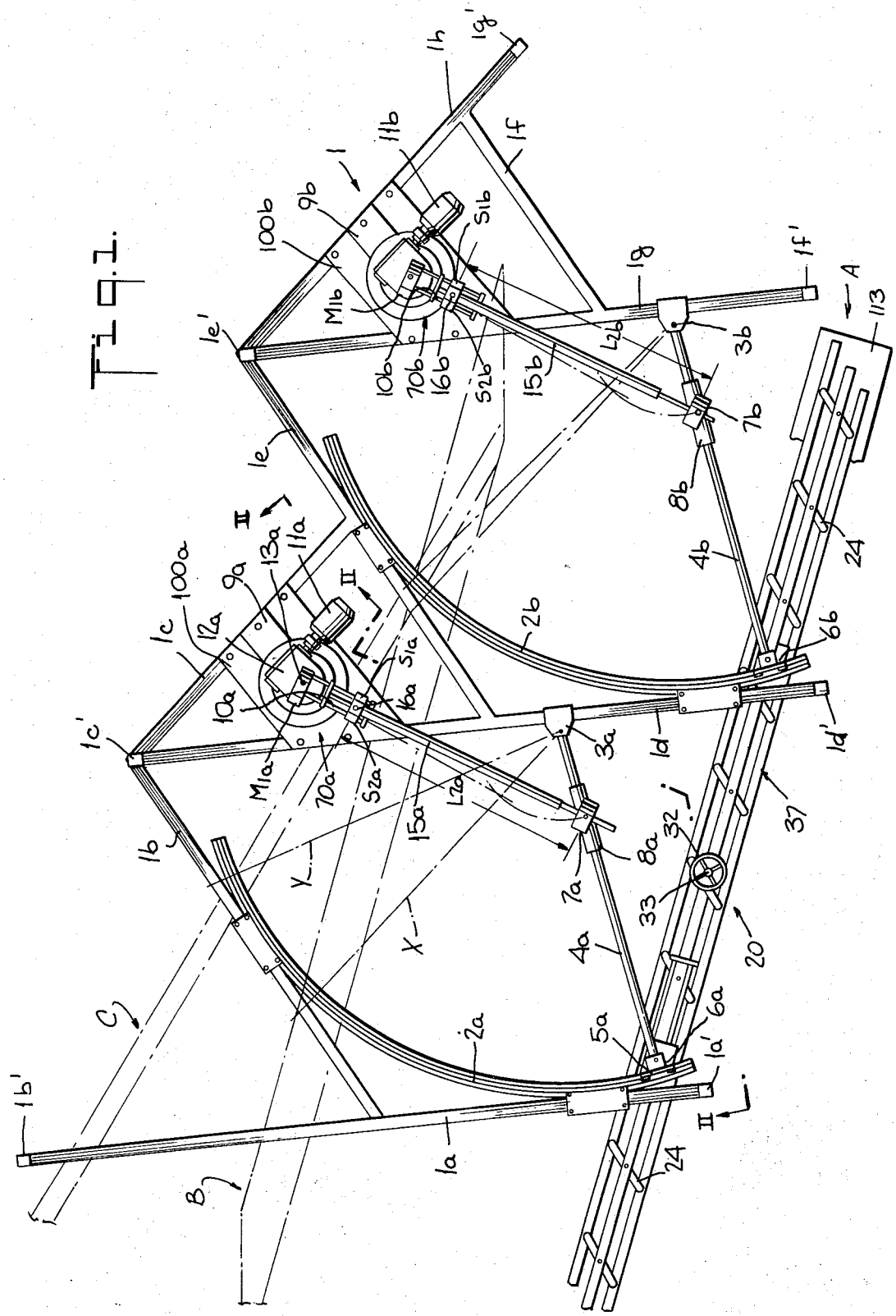

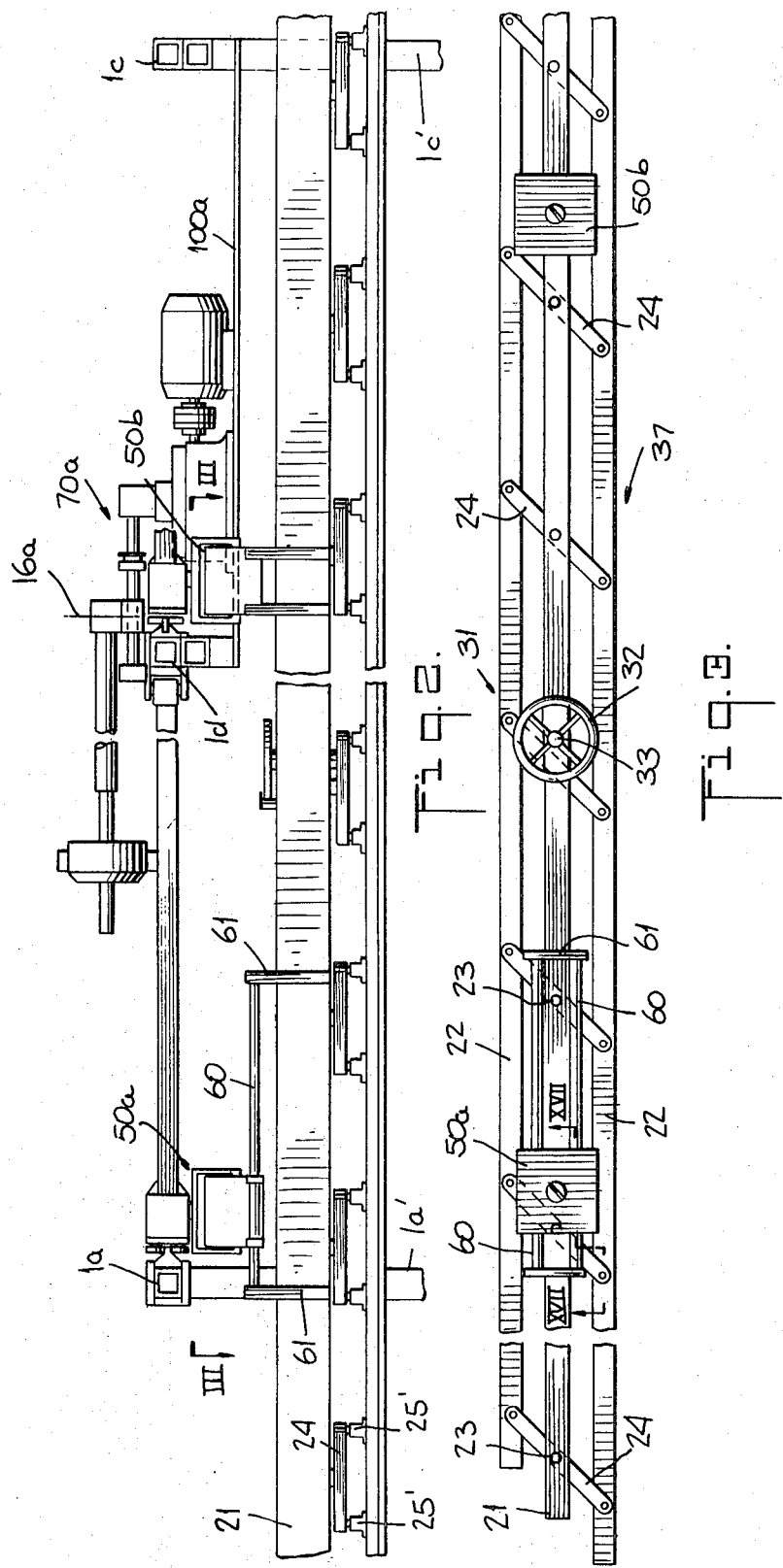

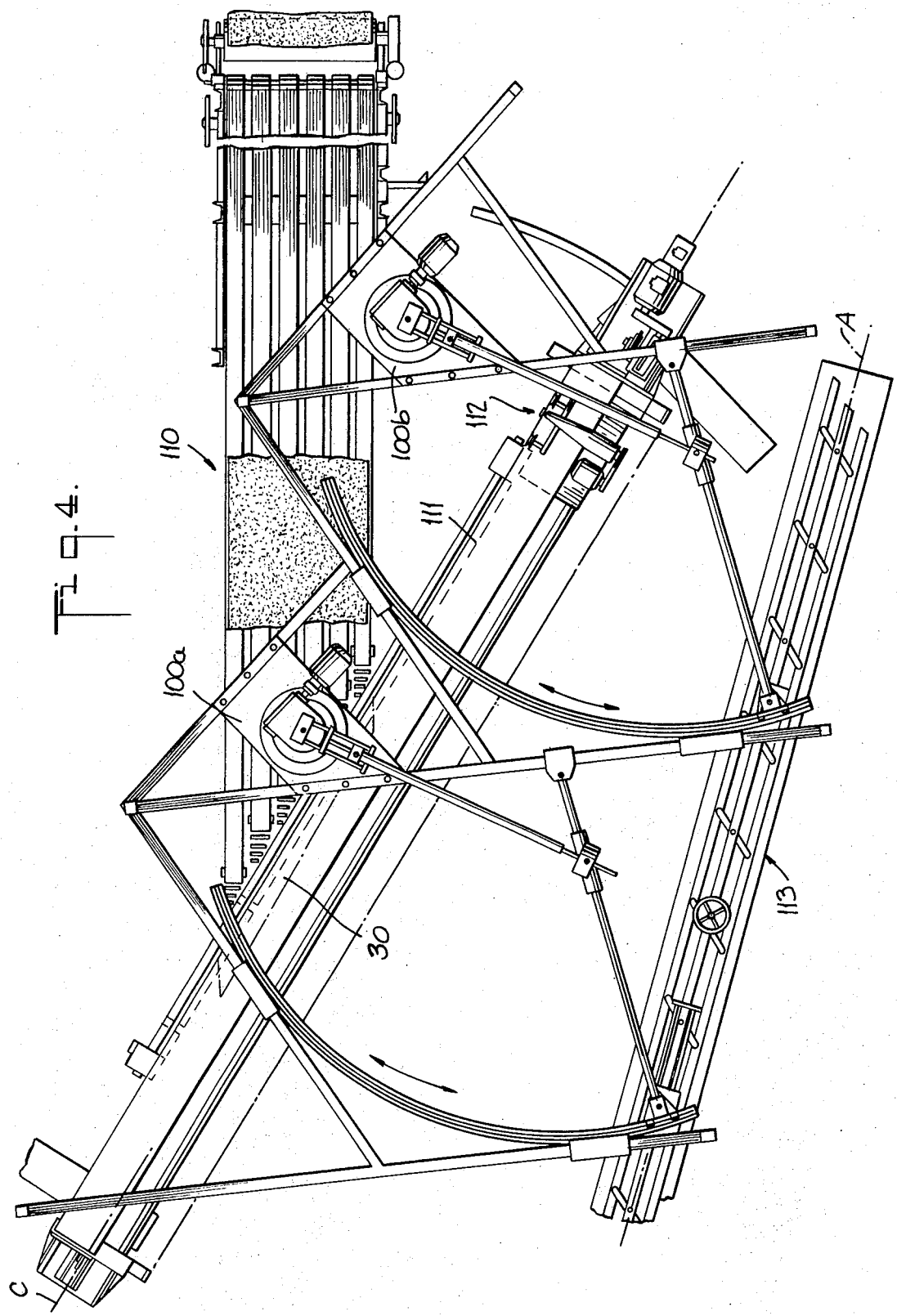

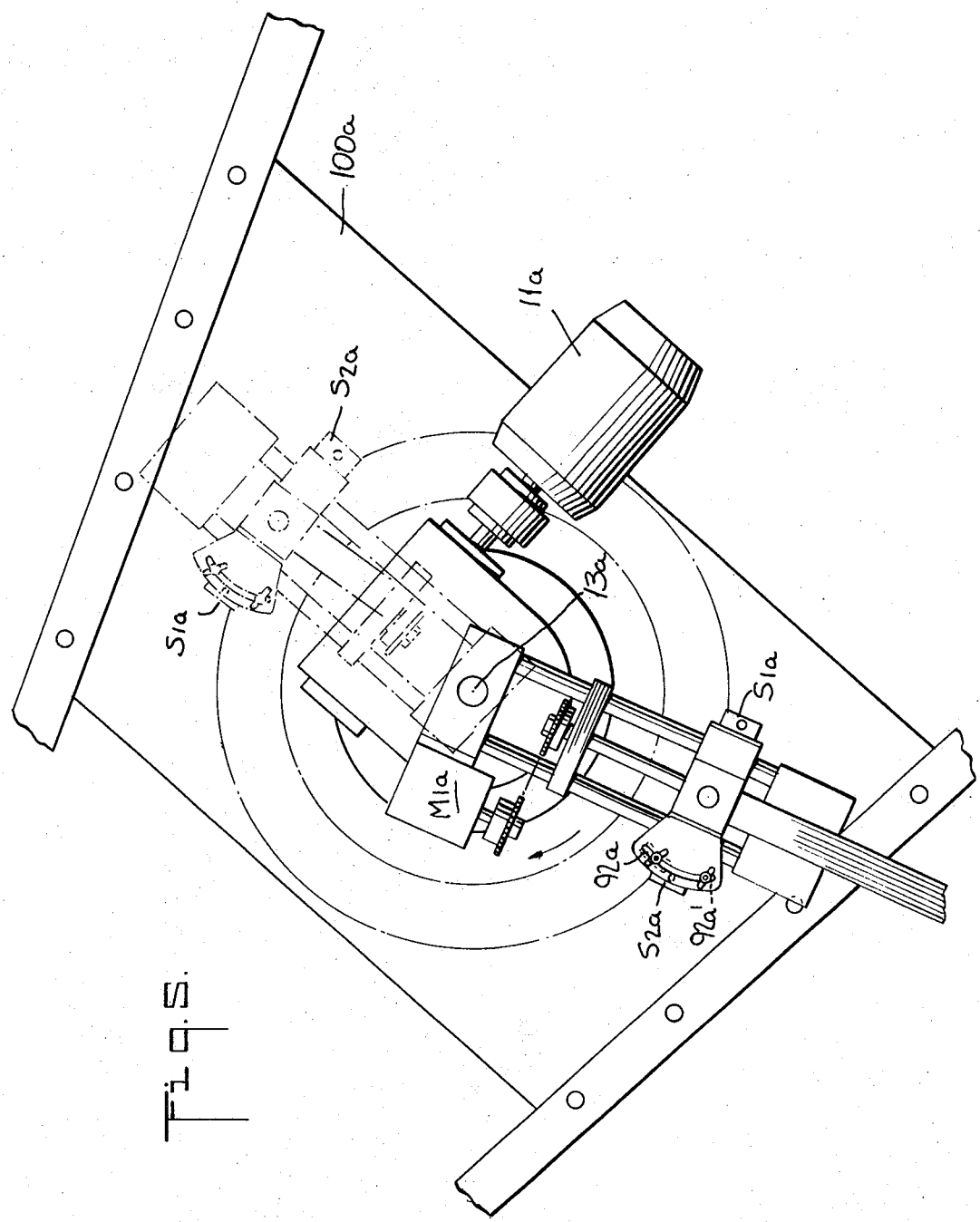

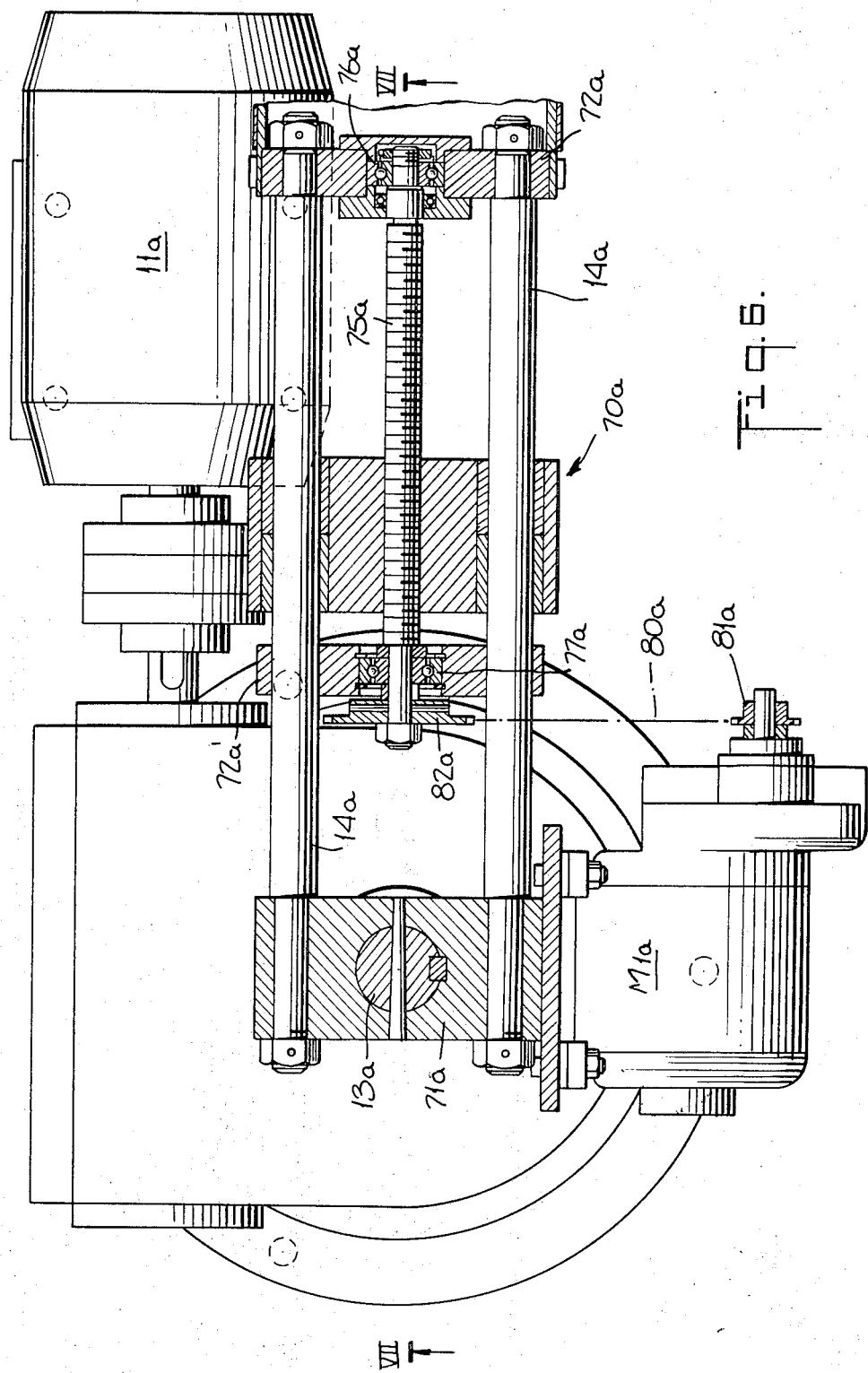

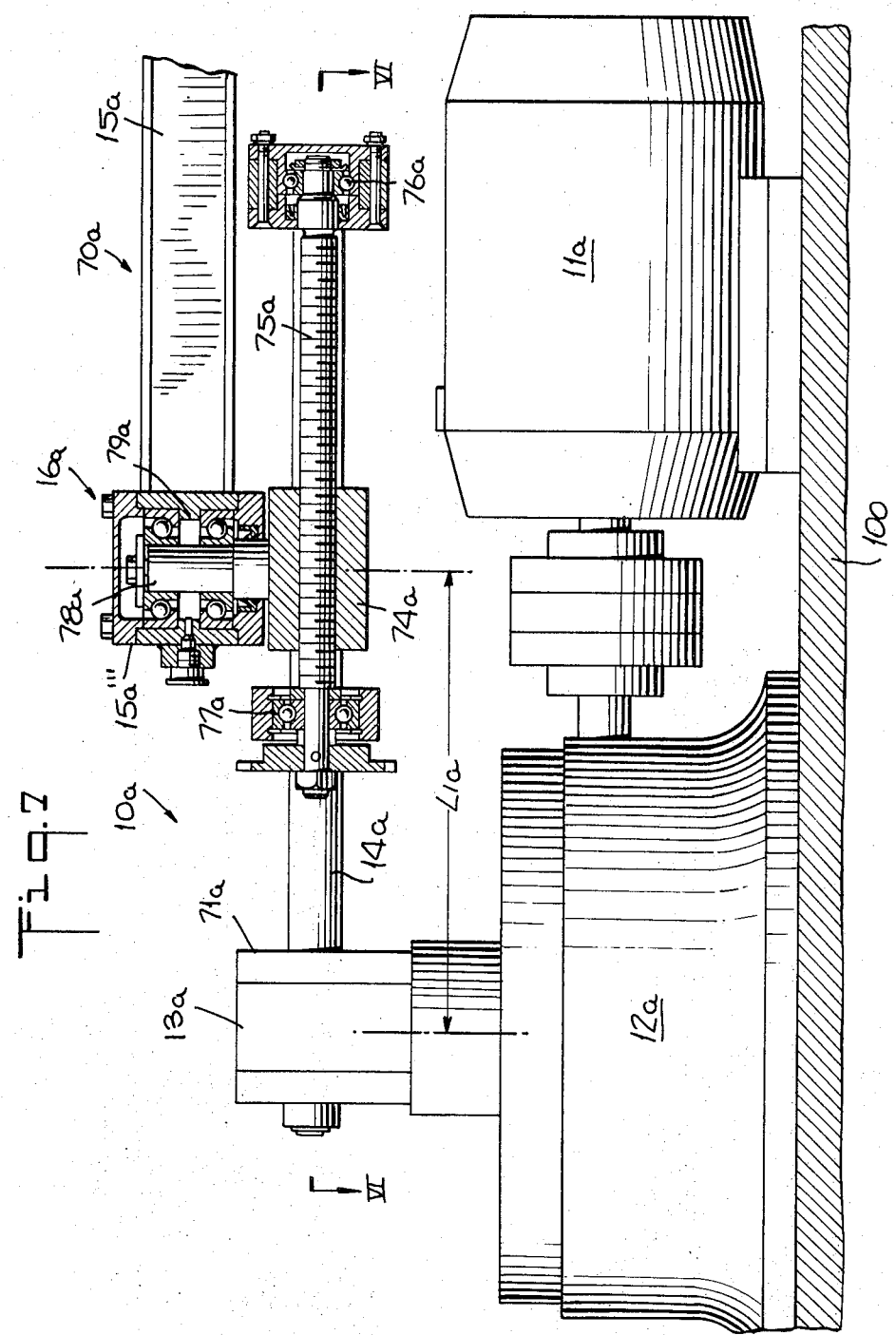

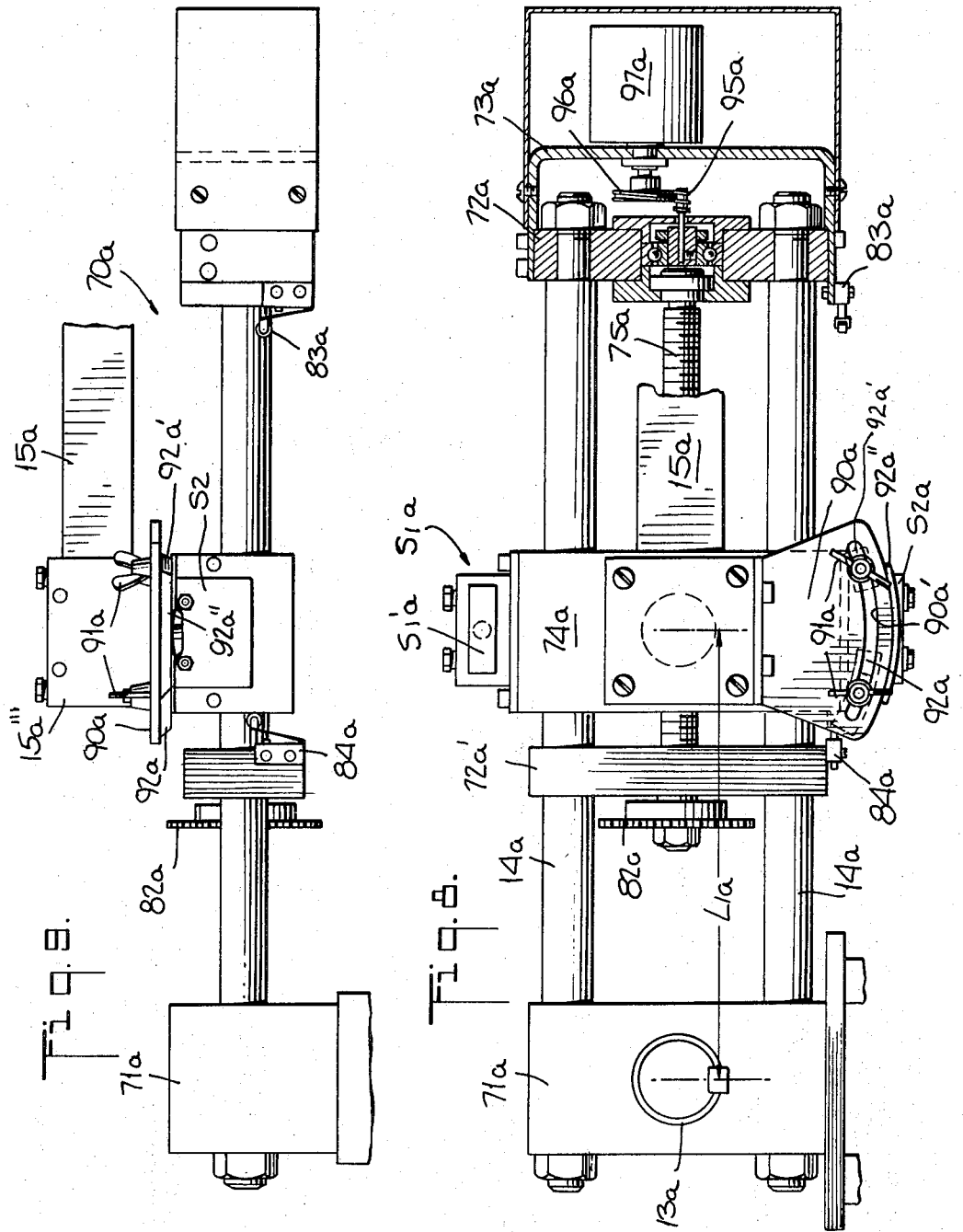

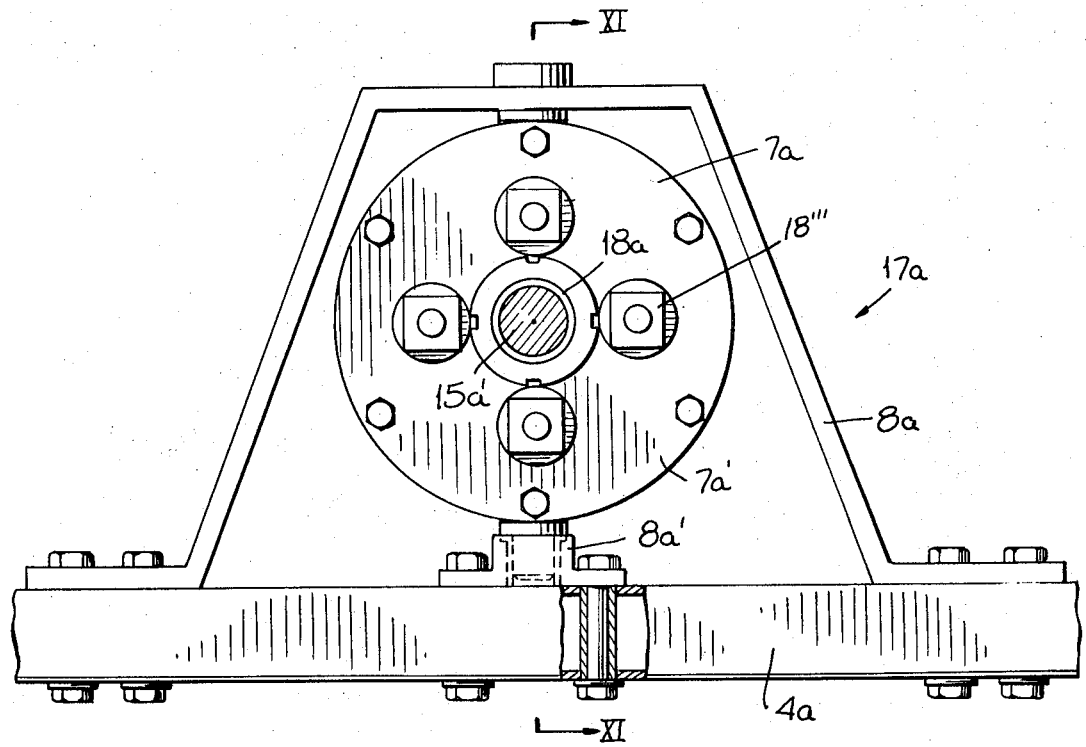
Fig.10.
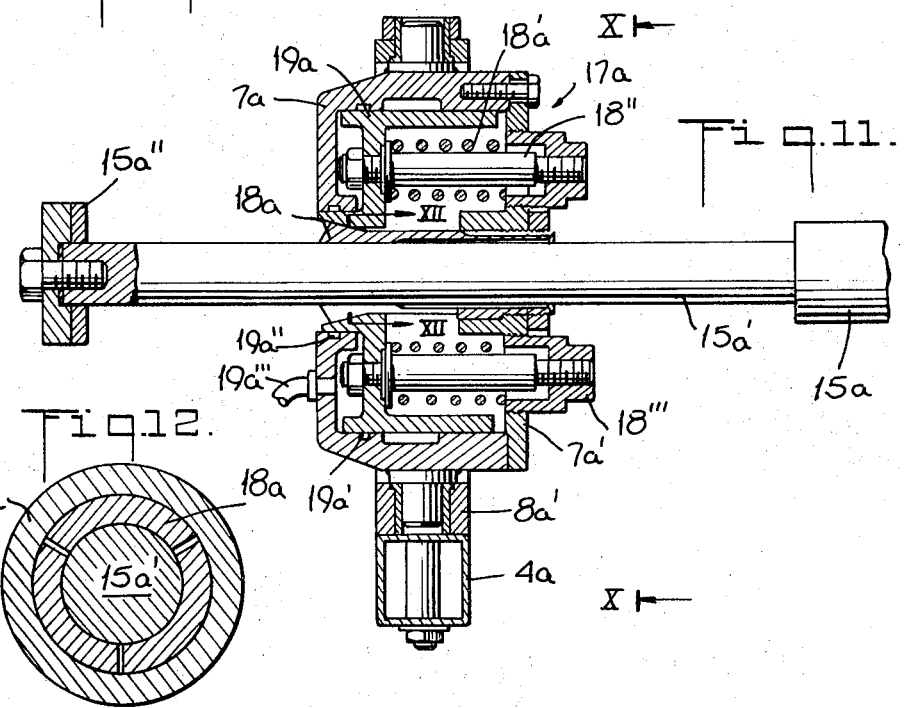
Fig.11.
Fig.12.

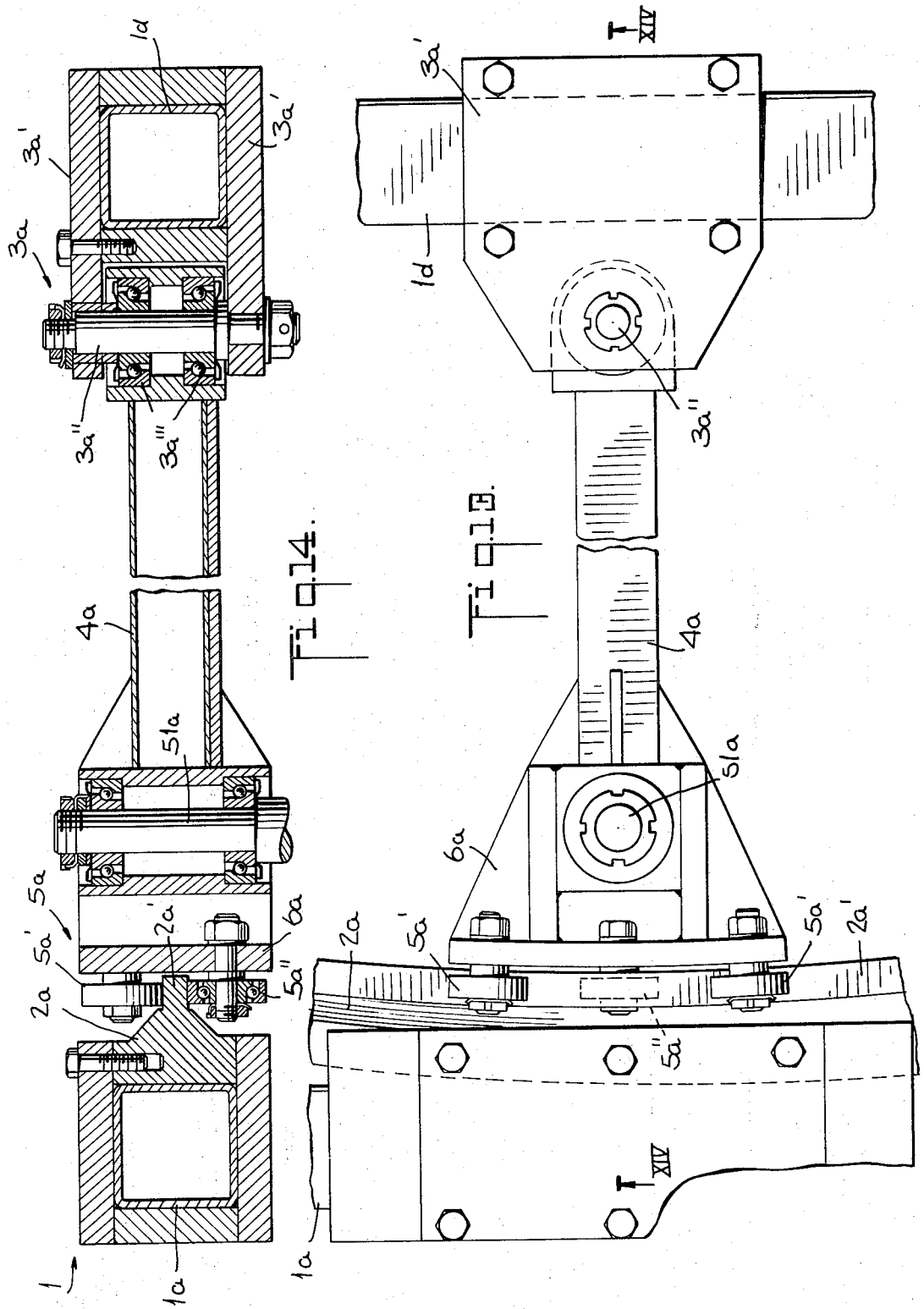

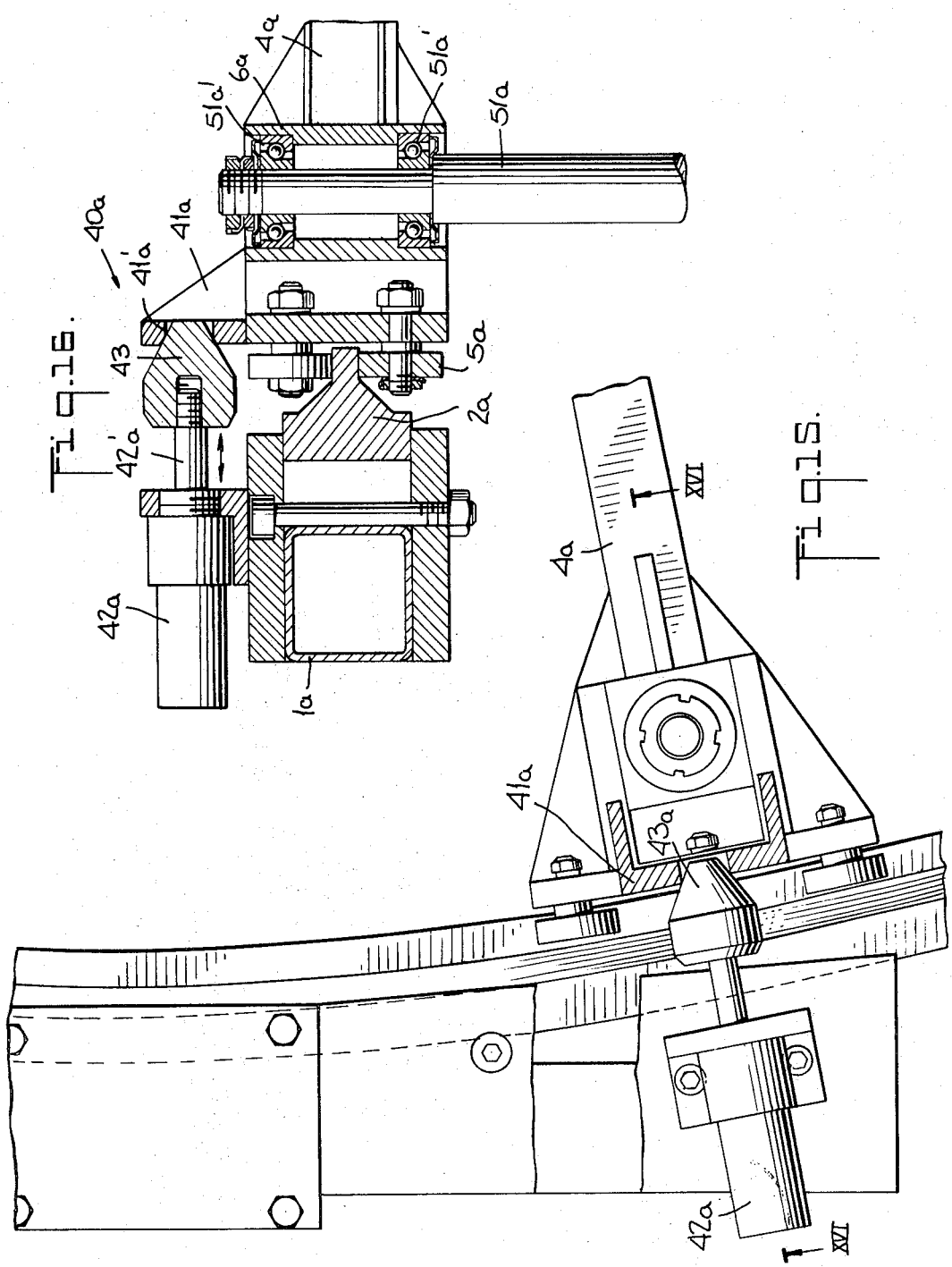

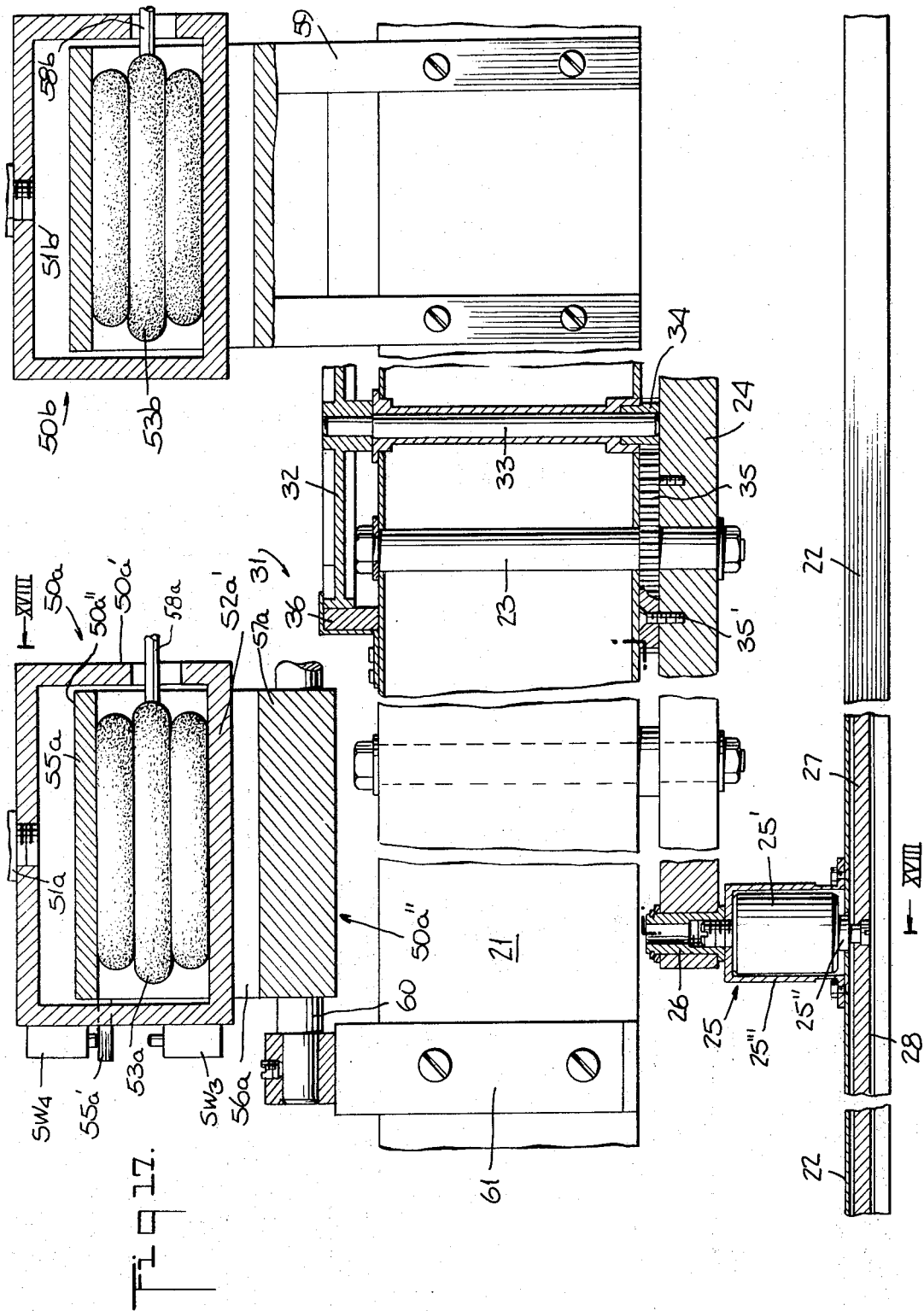

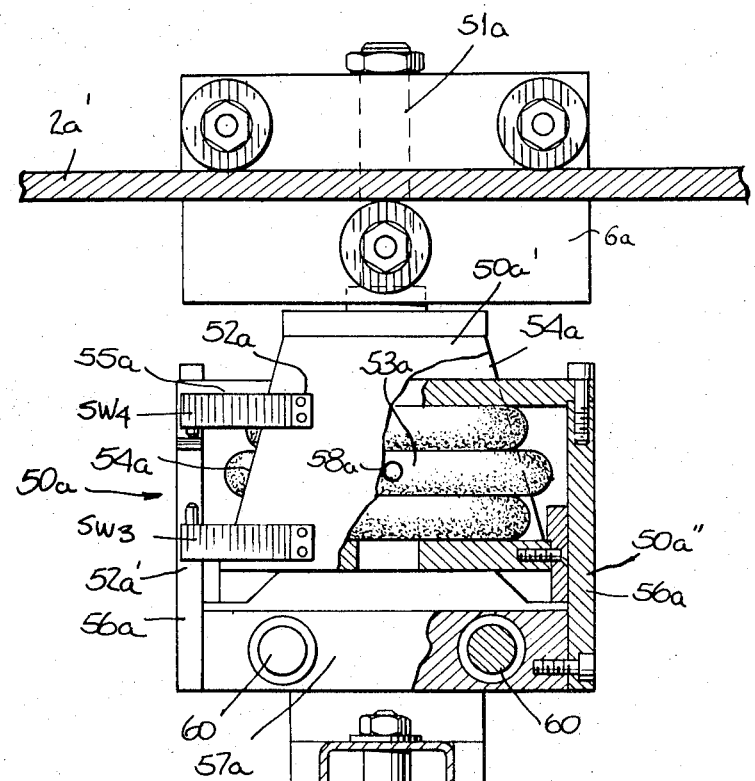
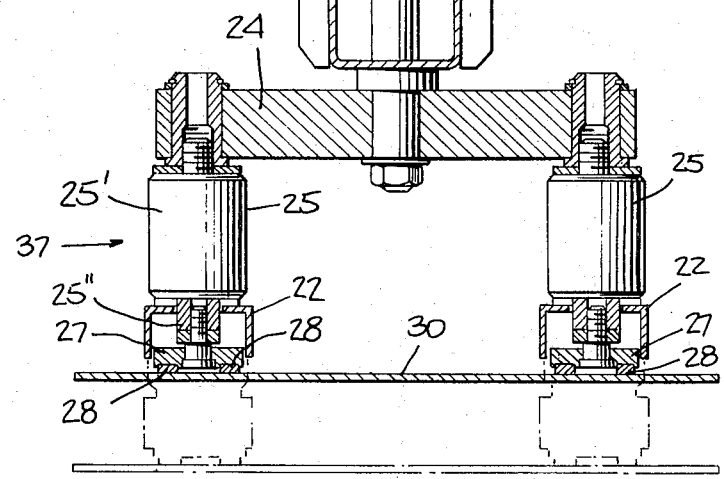
Fig.18.

TRANSFER APPARATUS

This is a division of Application Ser. No. 794,706 filed Jan. 28, 1969, now U.S. Pat. No. 3,613,903.

This invention relates to transfer mechanisms and more specifically to an apparatus for transferring an article, for example a cut piece of tire fabric, from a first location in which the article is oriented in any selected one of a plurality of directions, to a second location in which the article is always oriented in a given direction.

In the manufacture of pneumatic tires, bias-cut lengths of rubberized fabric are assembled upon a tire building drum in the form of plies. In forming these lengths of fabrics, a long, rolled length of fabric is normally bias-cut by means of a traversing knife at a cutting station to which the fabric has been carried by a conveyor. The cut lengths are then transferred to a joining table where they are aligned and joined end-to-end to be assembled eventually as part of a tire.

In the past the cut lengths were lifted from the conveyor by two operators and manually placed by these operators on the joining table. While attempts have been made to automatically, rather than manually, transfer the bias-cut strips from the conveyor to the joining table none of these provided satisfactory results particularly where strips of rather long lengths, i.e., cut at low bias-angles, were to be transferred as is the case with breaker strips used in building the breakers of radial ply tires. Furthermore, none of the known devices appear sufficiently versatile to handle bias-cut strips cut at different bias-angles, without requiring substantial adjustments and "down-time".

It is an object of the present invention, therefore, to provide a transfer apparatus which will eliminate the above-mentioned manual-handling operation.

It is a further object of the present invention to provide a transfer apparatus capable of accurately transferring relatively long, bias-cut, strips, i.e., those cut at relatively low bias-angles.

Another object of the present invention is to provide a transfer apparatus of the above type which is sufficiently versatile to be capable of handling strips cut at different bias angles with only a minimum of adjustment required.

Still another object of the present invention is to provide a transfer apparatus of the above type which can be easily adjusted to accurately deposit the biascut strips at a given location and in a given position irrespective of the bias-angle at which the strips are cut and, therefore, irrespective of the angular orientation of the strip at the initial position thereof.

Further objects and advantages of this invention will become apparent as the following description proceeds.

Briefly stated, the transfer apparatus according to one embodiment of the present invention comprises article carrying means including a pair of spaced support means respectively mounted for movement along a pair of parallel paths extending between a pair of locations. A pair of moving means are respectively operatively connected to the pair of article support means for moving the latter from one to the other of said locations. The moving means, respectively move the article support means different distances along the parallel paths so that an article carried by said carrying means, in moving from one location to the other, will be shifted angularly as well.

While the specification concludes with claims particularly pointing out and distinctly claiming the subject matter of this invention, it is believed that the invention will be better understood from the following description taken in conjunction with the accompanying drawings in which:

FIG. 1 is a plan view of one embodiment of the transfer apparatus according to the invention;

FIG. 2 is a somewhat enlarged elevational view, partly in section, taken along the line II—II of FIG. 1, in the direction of the arrows;

FIG. 3 is a plan view of the article support structure taken along the line III—III, in the direction of the arrows, of FIG. 2;

FIG. 4 is a diagrammatic plan view of the transfer apparatus of FIG. 1 showing its position relative to a fabric feed conveyor, a cutting table and a splicing table;

FIG. 5 is an enlarged plan view of the crank arrangement seen in FIG. 1, showing opposite end positions of the crank;

FIG. 6 is a plan view, partly sectional, taken along line VI—VI of FIG. 7, in the direction of the arrows, showing enlarged one of the pair of drive mechanisms illustrated in FIGS. 1 and 2;

FIG. 7 is a side elevational, partly sectional view taken along line VII—VII of FIG. 6, in the direction of the arrows;

FIG. 8 is a top plan view of the slider assembly illustrated in FIGS. 6 and 7;

FIG. 9 is a side elevational view of the slider assembly shown in FIG. 8;

FIG. 10 is a rear elevational view of the clamping means taken in the direction of the arrows X—X of FIG. 11;

FIG. 11 is a transverse sectional view taken along line XI—XI of FIG. 10, in the direction of the arrows;

FIG. 12 is a transverse sectional view taken along line XII—XII of FIG. 11, in the direction of the arrows;

FIG. 13 is a plan view showing, at an enlarged scale, the pivot arm and rail guide arrangement illustrated in FIGS. 1 and 2;

FIG. 14 is a sectional view taken along line XIII—XIII of FIG. 13, in the direction of the arrows;

FIG. 15 is a top plan view of an end position alignment mechanism for alignment of the pivot arm seen in FIGS. 13 and 14, in one end position thereof;

FIG. 16 is a partial, transverse sectional view taken along line XVI—XVI of FIG. 15, in the direction of the arrows;

FIG. 17 is a partial, partly sectional, enlarged view of the article carrying means illustrated in FIG. 3, taken along line XVII—XVII of FIG. 3, in the direction of the arrows;

FIG. 18 is a transverse, partly sectional view taken along line XVIII—XVIII of FIG. 17, in the direction of the arrows, and showing also, diagrammatically, a portion of the structure illustrated in FIG. 14.

In its preferred embodiment the transfer mechanism according to the present invention includes a frame means 1 having a plurality of horizontally disposed and fixedly connected struts 1a, 1b, 1c, 1d, 1e, 1f, 1g and 1h (FIG. 1). The aforesaid horizontally disposed struts are fixedly supported above the work area by a plurality of vertical struts 1a', 1b', 1c', 1d', 1e', 1f' and 1g' (FIG.

1). Rigid frame means 1 may be thought of as being constituted of a pair of substantially identical portions defined, for example, by struts 1a, 1b, 1c, on the one hand, and 1d, 1c, 1h, on the other hand. Also, the triangular area formed by struts 1d, 1c, and 1e is identical to the triangular area formed by struts 1g, 1h, and 1f. A pair of identical arcuate, horizontally disposed, rail guide members 2a and 2b are suitable fixedly connected, parallel to one another, to struts 1a, 1b and 1d, 1e, respectively. A pair of identical pivot means 3a and 3b are located on struts 1d and 1g, respectively, with their respective pivot axes coinciding with the axis of curvature of guide rails 2a and 2b, respectively. A pair of identical arms 4a and 4b are pivotally connected to pivot means 3a and 3b, respectively, and have free ends extending to the respective guide rails 2a and 2b (FIG. 13). The latter guide rails are provided with radially inwardly extending horizontally disposed flanges 2a', 2b', respectively, having upper and lower horizontally disposed parallel guide surfaces.

Located at and fixedly connected to the free ends of the arms 4a and 4b are roller guide assemblies 5a and 5b, respectively (FIGS. 13 and 14). Thus, identical parts on opposite portions of the frame means 1 have identical numbers, with the exception of the a and b designations and will henceforth, for the sake of brevity, not be separately described. For example, the roller guide means 5b is identical to the roller guide means 5a already described so that description for means 5b will not be necessary. Roller guide means 5a preferably includes a bracket 6a fixed to arm 4a and, in turn, carrying a pair of rotatably mounted horizontally spaced upper rollers 5a' having axes substantially normal to the pivot axis of pivot means 3a and being adapted to ride on and be guided by the upper horizontal guide surface of the radial lip 2a' (FIGS. 13 and 14) of rail 2a. A third roller 5a" is preferably rotatably mounted on the same bracket 6a on which upper rollers 5a' are mounted and is adapted to engage and be guided by the lower guide surface of lip 2a'. It will thus be seen, that whenever arm 4a pivots about the pivot axis of pivot means 3a, the roller guide assembly 5a will roll along and be guided by the arcuate, radially inwardly extending, lip 2a' of guide member 2a.

The pivot means 3a (FIG. 13) may, for example, be in the form of a pair of vertically spaced horizontal plates 3a', suitably rigidly connected to strut 1d of frame 1 and supporting therebetween a vertical pivot pin 3a" to which the arm 4a is rotatably connected via suitable bearings 3a''' (FIG. 14). The arm 4a can therefore swing about the axis of pivot pin 3a' with its free end guided along and supported by guide rail 2a.

A pivotable releasable clamping means 17a (FIG. 10) is provided along arm 4a, intermediate pivot means 3a and roller guide means 5a. Releasable clamping means 17a forms part of an adjustable means 79a (further described below) and includes an inverted, U-shaped, bracket 8a fixed at its lower ends by suitable means to the arm 4a. A suitable bracket 8a' is also suitably fixed to arm 4a and defines a bore in axial alignment with a vertical bore provided in the upper midportion of bracket 8a (FIG. 10). Clamping means 17a comprises a cylindrical housing 7a having a pair of diametrically opposite, vertically disposed, pivot pins suitably fixed thereto and extending radially outwardly therefrom. These pivot pins are received in the aligned bores of brackets, or connecting portions 8a and 8a', respectively, so as to permit a pivotal movement of the housing 7a with respect to arm 4a. Hollow cylindrical housing 7a is provided with a detachable rear wall plate 7a'. An annular piston 19a is axially movably positioned in housing 7a fluid-tightly engaging portions of the front and side walls thereof and defining a central bore in which there is received a relatively movable axially disposed collet 18a. Collet 18a is threadedly connected at one axial end thereof to the back plate 7a' and may be locked in place with a suitable nut (FIG. 11). The forward, springy end of collet 18a has an outer surface which tapers rearwadly and which is adapted to engage an oppositely tapering bore of the piston 19a. It will be seen that axial movement of piston 19e, in a direction to the left as viewed in FIG. 11, will result in the springy portions of the collet to be pressed radially inwardly so as to securely clamp therebetween the reduced diameter portion 15a' of connecting rod 15a which latter is received in and extends through the center of the collet. A spring means, which in preferred form includes a plurality of coil springs 18a' (FIG. 11), is suitably received in hollow housing 7a with the springs 18a' acting between the back plate 7a' and the piston 19a so as to normally urge the latter to a position in which the springy fingers of collet 18a are pressed radially inwardly, i.e., in clamping position, securely clamping the rod portion 15a' so as to prevent relative movement between the connecting rod 15a and the housing 7a. The effective length of the connecting rod 15a, i.e., the distance between the pivot axis of housing 7a on arm 4a and the pivot axis at the opposite end of rod 15a, namely the axis of pivot means 16a (to be more fully described below) is thus fixed.

The annular chamber formed between the face of piston 19a and the interior surface of the front end wall of housing 7a, i.e., the end wall opposite rear wall 7a (FIG. 11) is sealed by suitable sealing means which may be in the form of a pair of O-rings 19a' and 19a" fluid-tightly sealing the annular chamber while permitting relative axial movement of piston 19a. As aforesaid, coil springs 18a' normally maintain piston 19a in the position indicated in FIG. 11, i.e., in clamping condition. A suitable pressure fluid inlet and outlet means preferably including a flexible conduit 19''' and a suitable source of pressure fluid is connected in well known manner to the housing 7a in communication with the aforesaid annular chamber. When a fluid such as air, under pressure, is admitted through conduit 19''' to act against piston 19a, the latter will overcome the force of springs 18a' and piston 19a will move axially, in opposition to the springs, into release position with respect to collet 18 a. The springy fingers of collet 18a are then free to expand radially outwardly, thus releasing their grip on the rod portion 15a' received therein. In this released condition, i.e., when pressure fluid is admitted to the annular chamber overcoming the force of springs 18a' so as to force piston 19a backwardly, a longitudinal adjustment of rod 15a with respect to clamping means 17a is possible. As a result, the effective length of connecting rod 15a can be varied when fluid under pressure is admitted as described above.

A crank means 10a is provided for reciprocating connecting rod 15a which latter, in turn, causes arm 4a to oscillate to and from a given location A (FIG. 1), about pivot 3a. Crank means 10a may be in the form of a pair of horizontal guide rods 14a suitably connected via a keyed block 71a, in spaced parallel relationship, to the vertical shaft 13a (FIG. 6) of a spaced reducer 12a. An electrically reversible drive motor 11a having mechanical brake means (not shown) is suitably connected to reducer 12a for driving the latter in alternately opposite directions. Motor 11a is suitably fixed, for example by means of a plate 100a (FIGS. 1, 4, 5 and 7), to stationary frame means 1. Speed reducer 12a is also fixedly connected to plate 100 and its vertical output shaft 13a forms the crank shaft of crank means 10a. Suitable electric circuitry (not shown) is provided for driving motor 11a first in one direction and then in an opposite direction as determined by the switches A1 and S2 (FIGS. 8 and 9), i.e., driving the crank of means 10a approximately 180° in each direction as is more fully described below. The opposite ends of guide rods 14a are suitably fixed to and extend through a connecting plate 72a to the other side of which is fixed a housing 73a. Guide rods 14a are respectively fixed to block 71a at opposite sides of the shaft 13a so as to oscillate therewith (FIG. 8). A second connecting plate 72a' is also suitably fixed to the guide rods, extending transversely thereto, at a location intermediate plate 72a and shaft 13a. A carriage member 74a, located intermediate the connecting plates 72a and 72a' for movement relative thereto is provided with a pair of spaced bores preferably fitted with suitable sleeve bearings adapted to slidingly receive the guide rods 14a therein. Intermediate the guide rods and parallel therewith on a line intersecting the axis of shaft 13a, (FIG. 7) there is located an externally threaded lead screw member 75a, suitably mounted at opposite ends thereof in bearings 76a and 77a located respectively in plates 72a and 72a'.

The screw member 75a extends through and in mesh with an internally threaded bore provided on carriage member 74a for such purpose. A pivot means 16a is supported by carriage 74a and may be in the form of a pivot pin 78a (FIG. 7) suitably fixed to and extending vertically upward from carriage 74a. A suitable roller bearing assembly 79a is freely rotatably mounted on pin 78a and has an outer race received in a housing 15a'' to which one end of the rod 15a is conveniently connected. Rod 15a can, therefore, pivot with respect to carriage 74a, about the pin 78a, while the former oscillates together with crank means 10a about the axis of the crank shaft 13a. It will be obvious that rotation of lead screw 75a about its own axis will result in longitudinal movement therealong of carriage 74a. The direction of such movement depends, of course, on the direction of rotation of the lead screw. A lead screw drive motor M1a (FIG. 6) is also suitably connected to member 71a keyed to crank shaft 13a. The drive shaft of motor M1a is drivingly connected to lead screw 75a via suitable drive transmitting means, for example a drive chain 80a and a pair of sprockets 81a and 82a located respectively on the drive shaft of motor M1a and on the lead screw 75a.

A pair of limit switches 83a and 84a (FIGS. 8 and 9) are located on plates 72a and 72a', respectively, i.e., at opposite ends of the path of carriage 74a, and are suitably connected in circuit with motor M1a so as to interrupt power to the motor and thus prevent further movement of the carriage in the event the latter is accidentally driven too close to either end position thereof. A suitable circuit having manually operable control means, which may be in the form of a switch (not shown), is provided for controlling actuation of Motor M1a. A similar suitable circuit having manually operable control means (not shown) may be provided for controlling actuation of motor M1b so that these motors can be controlled independently through independent circuits for independent adjustment of carriages 74a and 74b with respect to the axes of crank shafts 13a and 13b, respectively. It is in this manner that the effective crank lengths L1a (FIG. 8) and L1b can be varied. It will be seen that when the crank length L1a is varied in the manner noted above, with the parts in the position indicated in FIG. 1 and clamping means 17a in related condition, the effective connecting rod length L1a is varied by a corresponding but opposite amount.

A pair of limit switches S1a and S2a (FIG. 8) are suitably fixed to opposite ends of the carriage member 74a with their actuator portions extending upwardly (FIG. 9). These actuator portions engage the underside of upwardly curved spring strips S1a' and S2a' respectively. The housing 15a'', rigidly secured to said one end of connecting rod 15a, supports the latter for rotation about bearings 79a (FIG. 7) provided on shaft 78a of pivot means 16a. Rigidly connected to this pivotable housing 15a'' is a horizontally extending bracket 90a provided with an arcuate slot 90a' whose center of curvature coincides with the pivot axis of pivot means 16a. A pair of wing nuts 91a, located above bracket 90a are used to fasten to the latter a pair of cam segments 92a and 92a' located below the bracket 90a and each having a threaded screw portion extending upwardly through the slot 90a' to engage the respective wing nut. The depth of cam segments 92a and 92a' is such that they will depress the spring strips S1a', S2a', thereby actuating the respective switch S1a or S2a, as the case may be, when the leading one of the cam elements 92a, 92a' reaches the predetermined position with respect to the switch S1a or S2a, as the case may be, depending on the direction of rotation of the crank shaft 13a. A cam segment 92a'' is fixed to the underside of plate 90a to provide continuity between the adjustable segments 92a and 92a'. Segment 92'' thus acts to maintain the respective switch S1a or S2a actuated in the region between segments 92a and 92a'. As the rod 15a pivots in a given direction about the pivot axis of pivot means 16a, therefore, one of the cam segments 92a, 92a', will actuate the respective one of the switches S1a or S2a when the arm 15a reaches the corresponding end position thereof. In response to such actuation and through suitable conventional circuit means (not shown) the respective switch will energize the brake of motor 11A, in a manner well known in the art, thereby stopping further rotation of the crank shaft 13a. Simultaneously therewith, again through suitable conventional circuitry (not shown) the future direction of rotation of motor 11A is reversed so that when next energized, the latter motor will rotate shaft 13a in a direction opposite to that in which it has just turned. Thus, cam segments 92a, 92a' secured to bracket 90a move with rod 15a relatively to the carriage 74a and, of course, relatively to the switches S1a and S2a. These cam segments 92a, 92a' are, however, angularly adjustable along arcuate slot 90a' requiring only loosening of the wing nuts 91a and moving the cam segments in the arcuate slot as described above. Adjustment of the cam segments, therefore, provides a means for adjusting the angular end positions of the crank means. As seen in FIGS. 1, 5 and 8, in the final end position A of rod 15a, the latter is in axial alignment with the screw member 75a of crank means 70a. At this time, the switch S2a is depressed by a fixed cam member 92a'' which provides for continuity of switch actuation intermediate the adjustable cams 92a and 92a' while the latter cams determine the point of initiation of switch actuation. It will be seen (FIGS. 8 and 9) that the movement of carriage 74a longitudinally along lead screw 75a, while resulting in a change in the direction L1a between the axes of the crank shaft 13a and the pivot means 16a, results simultaneously in an equal and opposite change in the distance L2a (FIG. 1) between the latter axis and the pivot axis of releasable clamping means 17a. Neverthelss, it will be seen that the sum of such distances, i.e., L1a plus L2a, remains constant as a result of any such adjustment. By simultaneously and oppositely varying the effective crank length L1a, on the one hand, and the effective connecting rod length L2a, on the other hand, when the parts are in the position indicated in FIG. 1, i.e., the connecting rod 15a is in axial alignment with the crank means 10a, and the article carrying structure 37 is in registry with location A, the opposite end position to which the article carrying structure 37 will be driven can be adjusted to any one of a plurality of locations only two of which are shown at B and C (FIG. 1). A fine-adjustment, for accurately adjusting the device to drive to such opposite end position can be made by adjusting the position of cam segments 92a, 92a' after loosening the wing nuts 91a. Thereafter, in operation, the transfer device will move a work-piece 30 from a position in registry with any chosen one of a plurality of second positions, for example a position in registry with location C, to a position in registry with location A. Because of the fixed position of splicing table 113 it is desired that no matter which second position is chosen via adjustment means 7a, 70b the final position, i.e., the position in registry with location A (FIG. 1) must always be the same. Thus, by merely adjusting the lateral position of pivot means 16a and, if necessary, the angular position of cam segments 92a, 92a', the transfer device according to the present invention will be capable of transferring an article 30 from any one of a plurality of locations, for example, location B or location C (FIG. 1) to always the same final position, i.e., the position in registry with location A. In operation, an article 30 is secured to the article support structure 37 at the chosen initial position, for example at C, raised upwardly, and then carried by structure 37 to a final position which latter is always in registry with location A (FIG. 1).

The aforesaid means 74a through 82a constitute part of the adjustment means 70a (FIGS. 6, 7, 8 and 9) for varying the effective length L1a of the crank means 10a. As will be seen, adjustment means 70a cooperates with the crank means 10a and with connecting rod member 15a to vary the distance between the axis of drive shaft 13a and the axis of pivot shaft 78a while simultaneously increasing or decreasing, as the case may be, the distance between the axis of pivot shaft 78a and the vertical pivot axis of connecting portion 8a, 8a', on arm, i.e., driven member, 4a. Thus, as may be seen in FIG. 1, an increase of the effective crank length L1a, i.e., the distance between the axis of shaft 13a and the axis of pivot 16a, results (with the clamping means 17a in released condition, i.e,, disengaged condition), in a complimentary decrease of the effective length L2a of the connecting rod 15a, i.e., a decrease in the distance between the axis of pivot means 16a and the pivot axis of clamping means 17a.

Adjustment of the effective crank and connecting rod lengths is accomplished as follows. As seen in FIG. 1, when the article support structure 37, to be described in more detail below, is in the end position indicated (location A), the crank rods 14a and 14b are in alignment, respectively, with the connecting rods 15a and 15b, so that any movement of the pivots 16a and/or 16b along lead screws 75a, 75b, respectively, results in longitudinal movement of the respective connecting rod 15a and/or 15b. As a result of such movement the respective connecting rod will extend to a further or lesser degree through the corresponding clamping means 17a, 17b, which latter are, of course, in released condition at the time. Thus while the distance between the axes of pivot means 16a and crank shaft 13a, and the distance between the axis of pivot means 16a and the pivot axis of releasable means 17a can be varied, the sum of these distances, i.e., the sum of the first distance (from the axis of shaft 13a to the pivot axis of pivot means 16a) and the second distance (from the axis of pivot means 16a to the pivot axis of the clamping member 17a, i.e., to the axis of connecting portion 8a, 8a'), remains constant.

It is preferred that the parts are in the position indicated in FIG. 1 of the drawings when making the above indicated adjustment with adjustment means 70a. Since it is required that the work piece 30, when transferred to its final position is in accurate registry with location A, it is required to accurately maintain the various parts in the final position thereof, i.e., at location A, during any adjustment of the initial position (e.g., the position corresponding to the B or C location of structure 37). To accomplish this there is provided a bracket 41a suitably fixed to arm 4a in the region of the roller guides 5a (FIGS. 15 and 16). Bracket 41a extends upwardly above the guide rollers 5a and is provided with a horizontal bore 41a' which is in inverted alignment with the longitudinal axis of arm 4a. A solenoid 42a is suitably mounted on strut 1a of frame 1, with its axis in vertical alignment with the axis of table 113 so as to be opposite bore 41a when the arm 4a is in the predetermined final position thereof, i.e., the position corresponding to the position of the work piece 30 in registry with location A. The movable armature of solenoid 42a is provided with a conical head portion 43a tapering in the direction of pivot means 3a and adapted to enter the bore 41a' for accurately locating arm 4a at the required angular position thereof.

Solenoid 42a is connected in a suitable conventional circuit which may include a manually operable switch for actuating the solenoid so as to lock the arm 4a preparatory to any adjustment of the opposite (i.e., adjustable) end position of the transfer device. In FIGS. 15 and 16 of the drawings, the conical portion 43a is shown in slotted condition, i.e., in engagement with the walls of bore 41a' to accurately locate and prevent movement of arm 4a during adjustment via adjustment means 70a. The proper angular position for arm 4a will be maintained by solenoid 42a until the latter is once more deenergized permitting conical portion 43a to retract. This can be accomplished manually through suitable circuitry well known to those skilled in the art.

Turning once more to FIG. 8 of the drawings, it will be seen that suitably connected to lead screw 75a at one end thereof, and coaxially therewith, is a worm member 95a meshing with a worm wheel 96a which latter may be pinned or otherwise suitably connected to the shaft of a rotary potentiometer 97a so that the wiper of the potentiometer 97a will, as is well known, rotate in corresponding to, but at a much slower rate, than, the lead screw 75a. Potentiometer 97a connected in a conventional balancing circuit which includes a manually adjustable potentiometer (not shown) and conventional circuitry for stopping motor M1a and thus the rotation of the lead screw 75a, when the balancing circuit is balanced, i.e., when the wiper of the potentiometer 97a has been driven by the lead screw to a position corresponding to the manually set position of the wiper of the aforesaid manually adjustable potentiometer (not shown). Potentiometer 97a, via the worm and the worm wheel 95a and 96a, respectively, therefore, serves as a position indicating device for indicating the amount of rotation of wheel 96a and thus directly indicating the amount of movement of carriage 75a, which, of course, results in a determination of the distance L1a. As noted, the aforesaid balancing circuit may be arranged so that when balance is achieved the reversible motor M1a is deenergized; or this may be manually accomplished by an operator watching a galvanometer in the balancing circuit and switching the motor off when the galvanometer indicates the circuit to be in balance.

A pair of support means 50a and 50b (more fully described below) are suspended from the brackets 6a and 6b, respectively, on arms 4a and 4b, respectively. These support means, in turn, together carry the article support structure 37 (FIG. 3) which is adapted to secure thereto a work piece 30 for raising the latter vertically from its initial position at location C, for example, (FIG. 1) and for transporting such work piece from such initial position to the final position in registry with location A. Support structure 37 securely holds the work piece during such transport, and then releases the work piece at location A in the manner to be described. The article support structure 37, according to the present invention, is thus capable of vertical as well as translatory movement and is furthermore capable of securing thereto a work piece 30. Since the preferred apparatus described herein is primarily intended for use with work pieces comprising some magnetically attractable material, e.g., the tire-breaker strips having metallic reinforcements embedded therein, the article support structure described herein comprises magnet means for securing the work pieces. It will be obvious, however, that for other types of materials, e.g., those which do not contain magnetically attractable materials, other securing means such as, for example, vacuum means which are well known in the art, may be used. The preferred article support structure 37 comprises an elongated article support beam 21 (FIG. 3) having a plurality of vertical shafts 23 rotatably supported therein and protruding downwardly therefrom at spaced locations therealong. These shafts, in turn, have rigidly connected at their lower ends, respectively, a plurality of horizontal cross bars 24. At the opposite ends of each of these bars 24 there is respectively pivotably supported, in axially vertical position, the upper end of housings 25 of solenoids 25'. A pair of parallel struts 22 extend parallely to and on opposite sides of beam 21, at a lower elevation than the latter. Each strut 32 had a downwardly open U-shaped cross-section. The struts are fixed by suitable means to the lower ends of housing 25 of the solenoids 25' located at the same side of beam 21 as the respective struts. These solenoid housings, in turn, are pivotally supported on the transverse members 24 for pivotal movement about their vertical axes. Thus, pivotal movement of the transverse members 24 about the respective shafts 23 will diminish or increase, as the case may be, the distance between struts 22. A pair of elongated bars 27 are respectively received in the channels formed by the downwardly open, U-shaped, struts 22. The electromagnets 25' have vertically movable armatures 25'' which extend downwardly therefrom through openings provided therefor in the struts 22. These armatures 25'' are in turn, suitably connected to the bars 27 at spaced locations thereon so that the latter will move vertically in response to actuation, i.e., energization, of the solenoids 25'. Thus, the bars 27 which are normally in the lower position thereof, as shown in FIG. 18, are moved vertically upwardly, within the confines of struts 22, in response to energization of the electromagnetic solenoids 25'. Adjacent the bottom face of each of the horizontal bars 27 are suitably connected thereto a pair of parallel substantially coextensive permanent-magnet strips 28. These strips are adapted to contact and magnetically attract a work piece 30 when the bars 27 are in lowermost position with respect to struts 22 as indicated by solid lines in FIG. 18. After a work piece 30 has been magnetically secured to the permanent magnet strips 28, as shown in FIG. 18, the transfer operation may proceed, as will be described in more detail below. When it is desired to release the work piece 30 after transfer thereof, the electromagnets 25 are energized, resulting in vertical upward displacement of the bars 27 and therewith of the magnet strips 28 (with respect to struts 22). to the position of these parts indicated in FIG. 17. Portions of the work piece 30 will, during such vertical displacement, abut against the lower edges of the U-shaped struts 22 and be stripped thereby away from the magnetic strips 28. Thus, during the upward movement of strips 28 the edges of struts 22 will act to separate the work piece 30 from the magnetic strips 28 and the work piece will be released from magnetic attraction to fall due to its own weight. In other words, the downwardly facing edges of the struts 22 act to strip the work piece 30 from the permanent magnet strips 28 during upward movement of the latter in response to energization of the electromagnets 25'.

In order to adjust the distance between the struts 22 so as to accommodate bias-cut strips 30 of different widths, there is provided an adjustment means 31 which may be in the form of a hand wheel 32 fixed to a vertical shaft 33 which is rotatably supported in the central region of beam 21 (FIG. 17). Shaft 33, which is spaced from the nearest one of the shafts 23, is drivingly connected, via a suitable meshing pinion 34 and gear 35, to the transverse element 24 which is supported by shaft 33. The pinion 34 is connected to the lower end of shaft 33 and meshes with gear 35 which is connected to the corresponding transverse element 24 by means of screws 35'. Rotation of the hand wheel 32 thus results in pivoting of all of the members 24 about the axes of their respective shafts 23 which in turn results in movement of the strips 22 further apart or closer together with respect to each other, depending on the direction of such pivotal movement. A suitable friction member 36 may be provided for maintaining the hand wheel 32 in any desired position of adjustment thereof.

Now that the preferred article-engaging structure has been described, the manner in which this structure is supported from the arms 4a and 4b so as to be moved by the cooperative action of the crank means 10a and 10b, will now be described.

The pair of brackets 6a and 6b located, respectively, at the free ends of the pivotable arms 4a and 4b constitute a part of the article support means herein. These brackets, in turn, support the article support structure 37 described above. Bracket 6a is provided with a vertical bore, as is identical bracket 66. Suitable thrust bearings 51a' are provided in the aforesaid bore for rotatably supporting a vertical, downwardly extending, shaft 51a. Thrust bearings 51a' suitably retain the shaft 51a to prevent the latter from moving vertically with respect to bracket 6a (FIG. 16).

A pair of open-ended rectangular housings 50a' and 50a'' (FIGS. 17 and 18) are vertically interlinked in a manner similar to the interconnection of two adjacent links of a vertical chain. Each of the housings 50a' and 50a'' is formed of a top wall, a bottom wall, and a pair of opposite side walls connecting said tip and said bottom walls and defining therewith an open ended horizontal chamber. The top wall of the uppermost housing 50a is provided with a suitable means, for example a threaded connection, for rigidly connecting thereto the lower end of downwardly extending shaft 51a.

The top wall 55a of the lowermost housing 50a'' is freely received in the open ended space formed by the walls of the uppermost housing 50a' and is vertically movable therein. Upper wall 55a extends laterally beyond the side and bottom walls 51a 52a' of upper housing 50a' through the open ends of the chamber formed by the latter. The pair of downwardly depending walls 56a of the lower housing connect top wall 55a to bottom wall 57a of the lower housing, said bottom wall extending beneath the bottom wall 52a' of the upper housing. An inflatable bellows 53a is disposed, with its axis vertically oriented, in the space defined between the upper plate 55a of the lower housing and the lower plate 52a' of the upper housing, thus providing a means for moving the two housings with respect to one another. A conduit 58a is suitably connected to bellows 53a for admitting gas under pressure to the interior thereof for inflating the bellows and for permitting the gas to escape when it is desired to deflate the bellows. A suitable conventional source of high-pressure gas (not shown) is provided together with suitable conventional valves (not shown) for admitting and releasing the gas, respectively, to and from the interior or bellows 53a. In response to admission of gas to the interior of bellows 53a, the latter will expand to lift the top plate 55a of the lower housing upwardly with respect to upper housing 50a'. Thus, the article support structure 37, which is connected to lower housings 50a' and 50b'', in the manner described below, may respectively raised or lowered by inflating or deflating the bellows 53a and 53b.

The bottom plate 57a of the lower housing 50a' is provided with a pair of parallel, horizontally extending, through-bores having suitable bearing sleeves positioned therein for slidingly receiving a pair of parallel guide rods 60 which are connected at opposite ends, by suitable brackets 61 to spaced locations along beam 21 (FIGS. 2 and 17).

Bracket 6b, housings 50b' and 50b'', shaft 51b, bellows 53b and the interconnection and arrangement thereof are identical to the above described bracket 6a, housings 50a', 50a'', shaft 51a, bellows 53a and the described arrangement thereof. Housing 50b'', however, unlike housing 50a', is fixed directly to the beam 21 by means of a suitable connecting bracket 59 (FIG. 17). The pair of support means 6a, 50a', 50a'', 51a, 53a, on the one hand, and 6b, 50b', 50b'', 51b, 53b on the other hand, are therefore, identical and it is only the connection between the respective support means and the elongated beam 21 which differs. Thus, one support means is longitudinally movably connected to beam 21 while the other is connected in longitudinally fixed position. The connection described, namely, the guide arrangement 60, 61 on the one hand, and the longitudinally fixed connection 59, on the other hand, permit the desired angular shift of the article support structure 37 during translatory movement thereof from, for example, the C location (FIG. 1) to the final end position, i.e.., in registry with location A.

The parts as shown in solid lines in FIG. 18 are in their raised position, i.e., the position of the parts with the bellows 53a in inflated condition. When pressure is released, and the bellows become deflated, the parts assume the position indicated by the dotted lines in FIG. 18, i.e., the lowermost position thereof. The weight of the beam 21 and the associated parts supported therefrom is sufficient to deflate the bellows upon venting the conduit 58a to the atmosphere through a suitable conventional valve arrangement (not shown).

In operation, the transfer device according to the present invention, is preferably positioned over and extends between a first work station, for example cutting table 111 (FIG. 4), where a continuous band of metal-reinforced rubber sheet stock is bias-cut into strips 30, and a second work station, for example splicing table 113, at which bias-cut strips 30, i.e., the works pieces herein, are longitudinally aligned in end to end relationship. A conveyor 110 (FIG. 4) may, for example, feed continuous lengths of material toward the cutting table 111 arranged at an adjustable angle with respect to the direction of feed of the conveyor. A cutter 112 which may be arranged to reciprocate along table 111, slices from the continuous material a biascut strip 30 assumed to be in registry with location C (FIG. 4) upon completion of such cut. As each strip 30 is cut from the remainder of the material, it is necessary to transfer the cut strip to the second work station (location A) placing the strip at such second work station in a position which is accurately in registry with the location A (FIG. 4), i.e., in registry with the center-line of splicing table 113.

The cutter table 111 is normally pivotally mounted for facilitating varying the bias-angle at which the strips 30 are cut. On the other hand, the splicing table 113 is normally fixed in position and is provided with a longituidnal conveyor. It is, of course, important when manufacturing radial-ply tires that the breakers thereof be formed of consecutive elements, i.e.., strips 30, which are in perfect alignment with one another since otherwise tire unbalance will result. Thus, the consecutive strips 30, placed on table 113, must be accurately longitudinally aligned with respect to each other preparatory to being spliced together end to end. Thus, irrespective of the angle of adjustment of cutter table 111, i.e., irrespective of the bias angle at which the strips 30 are cut, they must be delivered to the splicing table 113 in registry with the longitudinal axis thereof. The transfer mechanism must, therefore, be sufficiently versatile to transfer cut pieces 30 from a first position at a first work station, i.e., location C, for example, corresponding to any desired bias angle, to a second position at a second work station, i.e., location A at which the article 30 is in registry with such location A, i.e., with the axis of splicing table 113.

FIG. 4 illustrates the transfer apparatus, according to the present invention, positioned above an angularly adjustable cutter table 111 provided with a cutter 112 for cutting tire breaker material, delivered in continuous lengths along conveyor 110, into bias-cut strips 30, and for delivering these strips 30, one by one, as they are cut, to a spaced splicing table 113 which is fixed in position. The transfer mechanism is therefore, according to the present invention, adjustable, so as to permit pick-up of articles 30 from different initial angular positions thereof, depending upon the angular setting of cutter table 111, yet without interfering with the delivery of such articles to the same final position, in registry with location A of fixed table 113. Table 113, of course, remains fixed irrespective of the angular adjustment of the initial pick-up position C.

FIG. 5 illustrates in dotted lines, the crank means 10a according to the present invention, in its opposite end position, i.e., the position opposite to that illustrated in solid lines.

In describing the operation of the transfer device, the article support structure 37 shall be assumed to be in position C, i.e., in registry with the strip 30 which has just been bias-cut on cutter table 111. A suitable solenoid valve (not shown), connected to conduits 58a and 58b, may be actuated through a suitable electric circuit (not shown) for releasing the air which is assumed, at this time, to be present (under pressure) in the bellows 53a and 53b. With the bellows inflated, the latter maintains the article support structure 37 in raised condition, i.e., the solid line position of FIG. 18. A soon as the air is released from the bellows, the article support structure 37 drops to the lower, i.e., dotted line, position in FIG. 18. In this position of structure 37 the permanent magnet strips 28 rest on the upper surface of a cut strip or article 30 positioned on the cutting table. A pair of opposite, vertically spaced, limit switches SW3 and SW4 (FIGS. 17 and 18) are suitably fixed to housing 52a while a suitable actuating arm 55a' is suitably fixed to housing 50a' in position to actuate lowermost switch SW3 when structure 37 has reached its lowermost position, i.e., the dotted line position of FIG. 18, and upper switch SW4 when the structure 37 reaches the raised position, thereof, i.e., the solid line position of FIG. 18, Limit switch SW3, in turn, when it is actuated, actuates through suitable circuitry (not shown) the aforesaid solenoid value to again admit air, under pressure, to the interior of bellows 53a and 53b. The freshly admitted air causes the bellows to expand and to once more lift the support structure 37 from the dotted line position to the solid line position indicated in FIG. 18. Now, however, he article 30 is lifted by the structure 37, since the former adheres magnetically to the strips 28. The upper limit switch SW4 (FIG. 18) fixed to housing 50a opposite switch SW3, is adapted to be actuated by the same finger 55a' in raised condition of the structure 37. When upper switch SW4 is actuated by arm 55a' it energizes drive motor 11a, via suitable circuitry (not shown), for rotating the crank shaft 13a and therewith the crank means 10a approximately 180°, i.e., until the switch S1a is actuated by cam segment 92a' as shown in dotted lines in FIG. 5. Actuation of switch S1a by cam segment 92a' fixed to the connecting rod 15a indicates that the latter has reached its final position and thus that the support means 6a, 50a, etc., and therewith the article support structure 37 have reached their final positions placing the structure 37 and therewith the article 30 thereon, in registry with location A.

Suitable circuitry (not shown) is provided for simultaneously operating the solenoid valves connected to conduits 58a and 58b whenever admitting or exhausting air from the bellows 53a and 53b. Furthermore, limit switches S2a and S2b are connected in suitable circuitry (not shown) provided for simultaneously energizing, from a suitable source of electric powers, all of the electromagnetic coils 25', when both of the arms 4a and 4b have reached their final position as indicated by their respective cams 92a and 92b actuating the limit switches S2a and S2b. respectively (FIG. 5).

Suitable electric circuitry (not shown) is also provided, as noted above, for simultaneously controlling the operation of the locking solenoids 42a and 42b (FIG. 15). Solenoid valves (not shown) which cooperate with conduits 19a''' and 19b''', respectively, for admitting and releasing pressure through these conduits to the releasable clamping means 17a and 17b, respectively, are controlled manually through a pair of independent, switch-operated, conventional circuits. These latter circuits may, therefore, be manually energized by suitable means such as manually operable switches, when it is desired to release the clamping means preparatory to making an adjustment of distances L1a and L2a. Similarly, motors M1a M1b, are independently energizable through conventional independent electric circuits (not shown).

ADJUSTMENT PROCEDURE

Adjustment of the transfer device for accepting an article cut at a different bias angle, while maintaining the final delivery position of the article the same, may be accomplished in the following manner:

It will be assumed that the parts are in the position illustrated in FIG. 1, i.e., the article support structure 37 is in its final position, in registry with location A. The solenoids 42a and 42b (FIG. 15) are energized to lock the support means 6a, 50a, etc., and 6b, 50b etc., and the article support structure 37, depending therefrom, in the aforesaid final position A thereof. Simultaneously with locking the article support structure, the releasable clamping means 17a and 17b are placed in released condition by actuating the solenoid valves (not shown) which control the admission of pressure fluid through the conduits 19a''' and 19b''', respectively. The pressure fluid thus entering the annular chambers provided therefore in housings 7a and 7b, respectively, urges the pistons 19a and 19b in opposition to the spring pressures 18a' and 18b'. respectively, in a direction to release the connecting rods 15a and 15b for free longitudinal movement thereof. With the rods 15a and 15b thus released, the motors M1a and M1b may be energized by the aforesaid suitable manually controlled conventional electric circuits (not shown) for driving the pivot means 16a, and/or 16b, toward or away from the axis of crank shaft 13a, and 13b respectively, i.e., or increasing one and decreasing the other, as the case may be. FIG. 1 illustrates an adjustment position in which the pivot means 16a has been driven to a position further from the crank shaft axis 13a than the pivot means 16b is from its crank shaft axis 13b. In other words, distance L1a is greater (for the particular setting illustrated in FIG. 1) than distance L1b. Consequently, it will be seen, distance L1a is less than distance L2b while L1a and L2a = L1b + L2b. By thus independently varying the effective crank arm lengths of the crank means 10a and 10b, respectively, it is possible to obtain any desired initial angle position (B, C, etc.) for the article support means 37. It will be seen, that with the parts in the position illustrated in FIG. 1, i.e., the rods 15a and 15b in alignment with the respective crank rods 14a and 14b, a complimentary variation will take place in the effective connecting rod length, i.e., lengths L2a and L2b, respectively, when the crank lengths L1a and L1b are varied. When the desired crank length is achieved, i.e., when, for example, pivot 16a has been moved to the desired location along crank means 14a, motor M1a is deenergized. Thereafter, the solenoid valve controlling the pressure to the releasable clamping means 17a is actuated in a manner to permit discharge of the pressure fluid which has been acting on piston 19a. Upon release of the pressure fluid, piston 19a will move, in response to the force of the springs 18a', back to its normal position illustrated in FIG. 11, i.e., pressing the collet 18a into clamping engagement with the rod portion 15a' so as to once more fix the latter with respect to the arm 4a.

OPERATING CYCLE

After adjustment, to the desired initial position, of the distances L1a, L1b, as described above, the clamping means 17a and 17b are placed in clamping condition once more by admitting pressure fluid thereto as described above. The solenoids 42a and 42b are released by manual switching of the circuit provided for that purpose, and the drive motors 11a and 11b are energized. These motors then rotate the respective crank means 10a, 10b, in clockwise direction, as viewed in FIGS. 1 and 5, pivoting the arms 4a and 4b also in clockwise direction, as viewed in FIG. 1, to move the support means 6a and 6b along their respective paths, i.e., along the guide rails 2a and 2b, respectively. This movement proceeds until limit switch S1a is actuated by cam 92a' (FIG. 5) indicating that the adjusted initial position for support means 6a has been reached. Actuation of switch S1a, of course, results in braking of motor 11a thus preventing rotational movement of the crank means 10a. At the same time motor 11b has been rotating the corresponding crank means 10b and continues to do so until switch S1b is actuated by cam 92b' which, in turn, stops motor M1b, placing the article support structure in the desired C position (FIG. 1). Simultaneously with braking of the drive motors 11a and 11b they are electrically reversed in well known manner so that upon release of the braking action they will rotate in a direction opposite to that in which they previously rotated.

An electrical interlock may be provided with cutter means 112 and conveyor means 110 (FIG. 4) so as to assure that a work piece 30 is in position and that cutter means 112 has completed its cutting stroke and has moved out of the way before motors M1a and M1b move the support structure 37 toward the C position thereof. When the structure 37 reaches the desired initial article receiving position, for example the position C thereof, the switches S1a and S1b are actuated. These switches are connected in circuit with the solenoid valve which when actuated permits air to escape from the interior of bellows 53a and 53b through conduits 58a and 58b, thus permitting the article support structure 37 to descend to its lowermost position, indicated by dotted lines in FIG. 18. The cycle then continues, as previously explained, by lifting of the article support structure with the work piece 30 adhering to the permanent magnetic strips 28, transporting the work piece 30 from the initial position C to the location A and there releasing the work piece 30 by energizing the solenoids 25'.

It will be obvious from the above that by changing the crank lengths L1a and L1b, by different amounts, the length of movement of the article support means 6a and 6b, along the respective guide paths, as defined by guides 2a and 2b, respectively, will be different, thus permitting variations of angle of the initial article pickup position (for example, position C) with respect to the final article delivery position, i.e., that position which is in registry with location A (FIG. 1).

In the description of the operating cycle herein, reference has been made at times to subsidiary devices such as electrically braked motors, reversible motors, potentiometers, limit switches, solenoids, solenoid valves, etc., all of which are conventional items of hardware and are not shown in the drawings. Furthermore, the actual wiring circuits embodying these various devices are not illustrated because, with the explanation herein as to the functions performed by the circuits, the actual circuits will be readily evident to an electrician of ordinary skill, and full illustration of such circuits would only serve to complicate the drawings.

While a particular embodiment of this invention has been shown and described, it will be obvious to those skilled in the art that various changes and modifications may be made without departing from this invention in its broader aspects, and it is, therefore, intended in the appended claims, to cover all such changes and modifications as fall within the true spirit and scope of this invention.

Having thus described our invention, what we claim and desire to protect by Letters Patent is:

1. In a transfer apparatus for transferring an article from a first location, in which the article is in a first position, to a spaced second location, in which the article is in a second position spaced from and angularly shifted with respect to said first position thereof, in combination;
  a frame;
  stationary first pivot means fixed to said frame and having a first pivot axis;
  a first arm pivotally supported by said first pivot means for swinging movement about said axis;
  crank means on said frame comprising a crank arm, the axis of said crank means being spaced from and parallel to said first pivot axis;

connecting rod means extending from said crank arm to said first arm;

adjustable second pivot means carried by said crank arm for pivotally supporting one end of said connecting rod means for movement about a second pivot axis parallel to said first pivot axis;

drive means operatively connected to said second pivot means for adjustment of the latter on said crank arm toward and away from the axis of said crank means;

third pivot means carried by said first arm for pivotally supporting the opposite end of said connecting rod means, said third pivot means having an axis spaced from and parallel to said first pivot axis, and said third pivot means comprising releasable clamping means for releasably holding said connecting rod means in the region of said opposite end thereof, said clamping means being adapted to release said connecting rod means when said drive means moves said second pivot means toward or away from the axis of said crank means.

2. In a drive mechanism, in combination, a driven member adapted to move to and fro along a given path and having a connecting portion;

drive crank means comprising a crank member having a crank axis spaced from said driven member;

connecting means located on said crank member and adjustable lengthwise with respect thereto;

a motion transmitting member pivotally connected at spaced locations thereon to said connecting means and to said connecting portion, respectively, for reciprocating said driven member along said path, to and from a given first position in which said driven member is in registry with a given location, in response to movement of said crank member about said crank axis, releasable clamping means fixed to said connecting portion of said driven member and adapted to releasably clamp said motion transmitting member for permitting the distance between said spaced locations thereon to be changed;

and adjustment means cooperating with said connecting means for varying the distance between said connecting means and said crank axis, said adjustment means moving said connecting means with respect to said crank axis and with respect to said connecting portion so as to simultaneously and complementarily change said first and second mentioned distances, while maintaining the sum of said distances constant, whereby, the length of path traversed by said driven member during said reciprocatory movement thereof is changed in response to such adjustment while said given first position thereof remains in registry with said given location.

3. A drive mechanism according to claim 2, wherein said motion transmitting member comprises a connecting rod normally clamped by said clamping means.

4. A drive mechanism according to claim 3, wherein said crank means comprises limit switch means located on said crank member, said connecting rod comprising an adjustable actuating portion cooperating with said limit switch means for actuating the latter whenever a predetermined angular relationship between said crank member and said connecting rod is reached.

5. A drive mechanism according to claim 2, wherein said connecting portion comprises an elongated arm pivotally connected at one end thereof to said driven member and supported at the other end thereof for pivotal movement about an axis parallel to the axes of said pivotal connections.

6. A drive mechanism according to claim 2, wherein said crank means comprises drive means operatively connected to said crank member for imparting oscillating movement to the latter.

* * * * *